United States Patent [19]
Hennings

[11] Patent Number: 5,248,117
[45] Date of Patent: Sep. 28, 1993

[54] REGULATED DRAG AREA PARACHUTE

[75] Inventor: Elsa J. Hennings, Ridgecrest, Calif.

[73] Assignee: The United States of America as represented by the Secretary of the Navy, Washington, D.C.

[21] Appl. No.: 866,649

[22] Filed: Apr. 8, 1992

[51] Int. Cl.⁵ ............................................. B64D 17/14
[52] U.S. Cl. ..................................... 244/152; 244/142
[58] Field of Search ................. 244/149, 152, 142, 145

[56] References Cited

U.S. PATENT DOCUMENTS

| | | | |
|---|---|---|---|
| 2,356,169 | 8/1944 | Manson et al. | 244/142 |
| 2,371,898 | 3/1945 | Lisi | 244/152 |
| 2,736,524 | 2/1956 | Thebault | 244/152 |
| 3,136,508 | 6/1964 | Sepp, Jr. | 244/145 |
| 3,829,046 | 8/1974 | Matsuo et al. | 244/152 |
| 4,488,694 | 12/1984 | Penberthy | 244/152 |

FOREIGN PATENT DOCUMENTS 0402002  2/1943  France .................. 244/152

*Primary Examiner*—Joseph F. Peters, Jr.
*Assistant Examiner*—Christopher P. Ellis
*Attorney, Agent, or Firm*—Robert J. Hampsch; Melvin J. Sliwka; John L. Forrest, Jr.

[57] ABSTRACT

The disclosed invention is a regulated drag area parachute for decelerating a manned ejection seat or an ejectable capsule at a low altitude from an aircraft or other air vehicle. This parachute comprises a canopy composed of two portions, suspension lines, and a means for controlling the inflation of the canopy so that the two portions of the canopy inflate independently from one another. This means for controlling the inflation of the canopy provides a manner to regulate the rate of inflation of the lower portion of the canopy. Thus, the invention allows the top, or apex portion of the canopy, to inflate rapidly while the remaining portion of the canopy can be inflated subsequently and in a controlled manner so that the effective drag area of the canopy can be regulated during the deployment of the parachute.

14 Claims, 4 Drawing Sheets

REGULATED DRAG AREA PARACHUTE

BACKGROUND OF THE INVENTION

The present invention relates to parachutes and more particularly low altitude parachutes for use in both high velocity deployments as well as low velocity deployments.

The recovery of personnel resulting from low altitude ejections from military aircraft has become an increasingly difficult task. For many military applications the operational velocities are becoming greater causing the recoverable payloads such as ejection seats and ejectable capsules to become heavier due to the addition of protective equipment. The heavier payloads typically require larger parachutes so that they may be successfully recovered. The larger parachutes, however, take longer to inflate which may result in premature ground impact if deployed at low speeds and low altitudes.

Parachute opening speed is proportional to its deployment speed. This generates two major concerns which the recovery system must address. The two major concerns occur at the velocity extremes of the operational envelope. The first concern, as discussed above, is premature ground impact at low speeds due primarily to slow inflation. The second concern is the excessive opening forces that are present at high speeds.

At low speeds, the airflow surrounding the parachute is often too slow to fully inflate a large parachute in a relatively short time. This is due primarily to the inherently poor opening characteristic of standard parachutes which wastes or does not effectively utilize the available inflation air. There is often very limited time in which to inflate the parachute before ground impact. Thus in the low speed scenario, a major design goal is to speed up the inflation process of the parachute by capturing much of the available inflation air.

The opposite is true in the high speed regime, where the airflow velocity is sufficient to quickly inflate the parachute. The concern, however, is that the drag force caused by the parachute is proportional to the square of the deployment velocity multiplied by the effective drag area of the inflated parachute. Thus at high speeds when the parachute inflates very quickly, the drag forces can become excessive. If not controlled, these drag forces can exceed human tolerance limits or otherwise cause failures in the parachute, which is often equally fatal to the crew members. Therefore in the high speed regime, the design goal is to slow down or control the inflation process of the parachute in order to avoid excessive drag forces. Alternatively, one can attempt to control the drag forces by controlling the effective drag area so as not to exceed tolerable limits.

The related technology for speeding up the inflation of parachutes include a variety of techniques. The conventional methods for speeding up the inflation of a parachute include; reducing the permeability of the fabric or the porosity of the canopy or both. Also, one can close the vent of the parachute which prevents the trapped air from escaping. Yet another conventional method for speeding up the inflation of a parachute is to sew inflation pockets on the canopy around the outside of the skirt. These inflation pockets aid the spreading of the canopy by generating greater eddies of air around the parachute and contributing a small spreading force. These conventional methods, however, do not increase the opening speed of the parachute enough to warrant their use on low altitude military ejection applications.

One method currently used on some ejection seat parachutes to speed up inflation at low speed is a pull down vent line. This technique is also commonly known as pulling down the apex of the parachute. In this method a line attached to the vent area of the parachute is pulled down prior to deployment. When the parachute is deployed at low speed, the pulled-down vent forces the air entering the parachute to open the skirt quickly, allowing for a faster inflation. When the parachute is deployed at high speed, the pull-down vent line simply breaks allowing for normal inflation. The increase in opening speed of the parachute at low velocities is accomplished because the opening shape of the parachute is altered. However, by altering the shape of the parachute, the distribution of forces on the canopy are also altered. Altering the opening loads presents additional problems to those involved in parachute design.

Another way of speeding up inflation sufficient for use on ejection seat parachutes is with the use of a spreading gun. This gun explosively throws outward metal slugs that are attached around the perimeter of the parachute skirt. This spreading force acts to open the skirt very quickly. At high velocities this fast opening of the full canopy is undesirable because it can cause excessively high opening forces.

A third method used in this field for speeding up inflation is to use a cluster of smaller parachutes instead of one large parachute. While it is true that smaller parachutes will inflate faster, the increase in weight and complexity of such a system is viewed as a severe drawback.

On the other hand, the related technology for delaying the inflation of a parachute so as to avoid excessive opening forces is staged deployment systems. One such staged deployment system is a reefed parachute. This system employs a reefing line that prevents the parachute skirt from fully opening until a timed pyrotechnic line cutter severs the reefing line allowing the skirt to fully open. This type of staged deployment system distributes the opening forces in two or more smaller peak forces instead of one large peak force. Reefed parachutes and other staged deployment systems are not typically desireable during low velocity deployments. This is because any delay in inflation of the parachute can result in premature ground impact.

The present invention is a single parachute system which can recover a payload throughout virtually the entire performance envelope of military aircraft. That is to say, the regulated area parachute disclosed herein is capable of safely and successfully opening in both low speed situations as well as the high speed situations. The present invention is a significant advancement in recovery system technology which addresses the age old problem of minimizing the parachute inflation time while also minimizing the opening forces. This new parachute is especially effective in solving the problem of low altitude recovery of manned ejection seats and ejectable capsules.

SUMMARY OF THE INVENTION

The present invention is a regulated drag area parachute for decelerating a manned ejection seat or an ejectable capsule from an aircraft or other air vehicle. This parachute comprises a canopy composed of two portions, suspension lines, and a means for controlling the inflation of the canopy so that the two portions of the canopy inflate independently from one another. This means for controlling the inflation of the canopy provides a manner to regulate the rate of inflation of the lower portion of the canopy. Thus, the invention allows the top, or apex portion, to inflate rapidly while the remaining portion of the canopy can be inflated subsequently and in a controlled manner so that the effective drag area of the canopy can be regulated during the descent.

The two portion canopy comprises an apex portion and a reef portion attached to one another. The apex portion preferably has an upper skirt band located proximate the location where the apex portion and the reef portion of the canopy are attached. The parachute also has a lower skirt band located on the reef portion of the canopy at the lower skirt of the parachute. The preferred constructed shape of the parachute is a flat circular parachute, however various alternative constructive shapes such as conical, hemispherical or cross, may be considered.

The preferred means to control the inflation of the canopy and regulate the effective drag area of the parachute employed by the present invention involves a network of internal lines and reefing rings arranged so that the apex portion of the canopy opens immediately upon deployment. The reef portion of the canopy, however, is initially set in a reefed condition such that it will not open significantly upon deployment. The reef portion of the canopy can be subsequently disreefed at a regulated rate during the descent of the payload.

In the reefed condition the upper skirt band and lower skirt band are in close proximity to each other. This condition restricts the ability of the reef portion of the canopy to inflate. As the canopy is disreefed, the lower skirt band moves away from the upper skirt band thus opening the mouth of the reef portion of the canopy and allowing the reef portion of the canopy to partially inflate. The further the separation between the upper skirt band and the lower skirt band, the more the reef portion of the canopy will inflate thereby increasing the effective drag area of the parachute.

This network of internal lines and reefing rings include as a minimum, a plurality of reefing rings attached to the canopy proximate the upper skirt band. In addition, an adjustable length reefing webbing attached to the payload and extending towards the apex portion of the canopy is preferably included. Lastly, a plurality of fixed length internal lines connecting the reefing webbing to the lower skirt band. These internal lines are further disposed such that they pass through the reefing rings proximate the upper skirt band forming a system resembling a pulley system. As the adjustable length of the reefing webbing is increased, the canopy is disreefed by virtue of the pulley-like network of reefing rings and internal lines. It follows that if the adjustable length of the reefing webbing is decreased, it is possible to reduce the effective drag area of the parachute.

The method of regulating the disreefing of the canopy thereby controlling the inflation of the canopy and regulating the effective drag area of the parachute includes a reefing device. This reefing device or mechanism is connected to the reefing webbing whereby the adjustable length reefing webbing and internal lines are locked in place when a predetermined maximum drag force is attained. When the drag force caused by the parachute is below the predetermined maximum drag force, the reefing webbing is free to pay out thereby further disreefing the canopy. Such a reefing device is a simple modification of existing braking mechanisms known by those skilled in the art.

It is an object of the present invention to provide a parachute capable of recovering an ejectable capsule or manned ejection seat from an aircraft throughout virtually the entire operational envelope including low altitude recovery of the payload at both high and low speeds.

It is another object of this invention to provide a relatively low weight and low cost parachute system which minimizes the parachute inflation time while also minimizing the opening forces caused by the parachute.

It is yet another object of this invention to provide a parachute capable of inflating quickly at low altitudes and low velocities so as to avoid premature ground impact and injury to the crew members.

It is yet another object of this invention to provide a parachute capable of inflating at a regulated rate at high velocities so as to maintain tolerable opening forces. Thus the parachute can inflate at a rate proportional to the velocity decay, thereby keeping the drag force approximately constant during the period through which the parachute is opening.

It is yet another object of this invention to provide a simple parachute system design that is highly reliable and operates in a safe manner (i.e. without pyrotechnic devices) such that recovery of the crew member can be accomplished without injury.

It is yet another object of this invention to provide a parachute system which regulates the effective drag area of the parachute during the descent. The regulation of the effective drag area is accomplished by varying the effective area of the parachute or the coefficient of drag of the parachute or both.

A feature of this invention is the unique means to control the inflation of the canopy and regulate the effective drag area of the parachute. Another feature of importance is the ability to easily employ this unique means of controlling the inflation of the canopy and regulating the effective drag area into a variety of other parachute applications beyond the low altitude scenario.

An advantage of the present invention over other similar type parachutes is the opening force versus time profile achieved by the regulated drag area parachute. The opening force versus time profile of the present invention approaches an optimal curve for low altitude parachutes.

The present invention satisfies these identified objectives and incorporates the preceding features and advantages in a manner that is apparent from consideration of the drawings and the detailed description of the invention.

DETAILED DESCRIPTION

As aircraft operational speeds become greater, protective ejectable capsules may begin to replace conventional ejection seats. These ejection capsules can significantly increase the recovery weight or payload weight which in turn requires larger parachutes for the recovery system. Because larger parachutes take longer to inflate than smaller parachutes, low altitude recovery of the heavier payloads presents a difficult task.

A parachute designed for low attitude recovery requires that the parachute be inflated quickly enough at low speeds to attain an acceptable descent rate before ground impact but not inflated so quickly at high speeds that it would cause injury or death from excessive opening forces cause by the parachute. The parachute further needs to be sufficiently large to decelerate the payload enough to avoid injury to the crew. Thus at low altitude, it would be desireable to control the inflation speed as a function of deployment velocity.

Parachutes naturally open very quickly at high speeds and relatively slowly at lower speeds. In order to have a single deployment system large enough to decelerate heavy payloads coupled with the capability to allow for rapid inflation at low speeds and slower inflation at high speeds a unique deployment system was devised. This unique deployment system comprises a means for controlling the inflation of the canopy and regulating the drag forces caused by the parachute by continuously controlling the effective drag area of the parachute. This is accomplished so as not to create opening forces which exceed human tolerable limits. The means for controlling the inflation of the canopy and regulating the effective drag area of the parachute will become apparent from consideration of the drawings and the paragraphs that follow.

To aid in a clear understanding of the present invention it may be helpful to consider the present invention by way of a comparison to related or conventional parachutes. FIGS. 1a-1d depicts a conventional parachute throughout the inflation process. Specifically, FIGS. 1a-1d illustrate the traditional flat circular parachute immediately after ft is deployed, at two intervals during the inflation process, and finally during steady state descent.

Figures 1A, 1B, 1C, 1D:
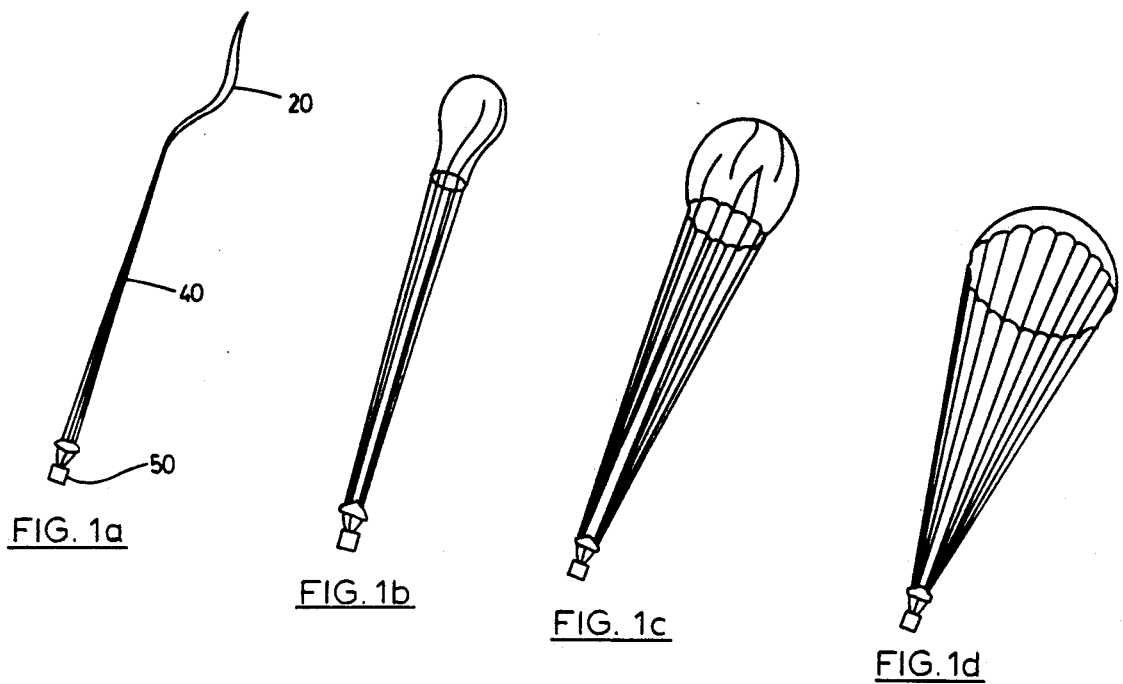
FIGS. 1a through 1d shows several views of a conventional parachute in various stages of deployment.
Figures 2A, 2B, 2C:
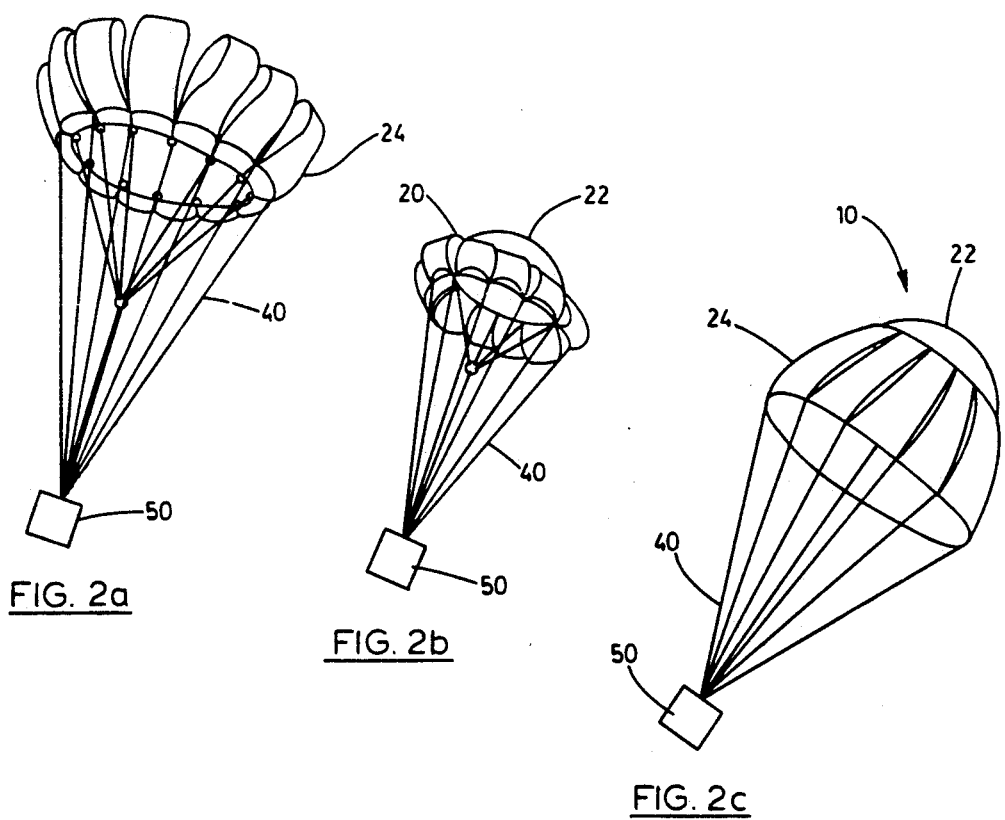
FIGS. 2a through 2c shows several views of the present invention in various stages of deployment.

FIGS. 2a-2c depict the present invention also at various intervals in the deployment phase. These drawings illustrate the present invention immediately after deployment, at an intermediate stage in the deployment process, and the full open condition, as seen in FIGS. 2a-2c respectively.

The total elapsed time it takes from initial deployment to full open or steady state descent for most parachutes will be inversely proportional to the drag force caused by the parachute. The drag force caused by a parachute is approximated with the following algorithm:

$$F=(0.5)\rho V^2 C_D A$$

where 'A' is the effective area of the parachute. The effective area is approximately equal to the surface area of the parachute that is roughly perpendicular to the flow of air. The variable 'V' is the velocity of the payload. '$C_D$' is the coefficient of drag associated with the particular parachute constructed shape or configuration. Lastly. the variable $\rho$ is the density of the medium through which it is traveling. It is important to note that the phrases 'effective drag area' or 'drag area' are equivalent and is equal to the product of the effective area 'A' and the coefficient of drag '$C_D$'. In a given recovery scenario, the deployment velocity and density of the medium, are unalterable. The only remaining terms in the above equation which will permit controlling the drag force during descent is the effective drag area ('$C_D$'*'A').

The present invention comprises a parachute system which regulates the effective drag area of the parachute during the descent. The regulation of the effective drag area is accomplished by varying the effective area of the parachute or the coefficient of drag of the parachute or both.

The opening process of a parachute is dependent on the volume of air allowed to enter the parachute and the rate at which R enters. With a conventional parachute, as seen in FIGS. 1a-1d, the skirt is initially almost closed. Only a small volume of air is entering and filling the canopy. As the canopy collects more air, the apex of the canopy begins to inflate and slowly forces the remainder of the parachute open, until the skirt finally opens completely. The larger the parachute, a greater volume of air is required to be collected in order to force the skirt open. This is generally how most parachutes will naturally open. It is apparent that the inflation of a parachute in this manner is very wasteful of available air, as a relatively small volume of this air is initially allowed into the parachute.

The regulated drag area parachute, however, is designed to use a greater volume of the available air. As seen in FIGS. 2a-2c, the parachute is deployed in the same manner as the conventional parachute. Due to the small volume of air required to inflate the apex portion of the canopy, it inflates quickly forcing the upper skirt to open early in the opening process which allows a large volume of air to enter the parachute. This large volume of air is then used to regulate the inflation of the remaining portion of the canopy and thus regulate the effective drag area of the parachute. FIGS. 1 and 2 clearly illustrate the different operating characteristics of the regulated drag area parachute. The present invention inflates in a manner contrary to the way most prior art parachutes naturally open. Furthermore, the intermediate configurations of the regulated drag area parachute are substantially different as compared to prior art parachutes.

Figure 3:
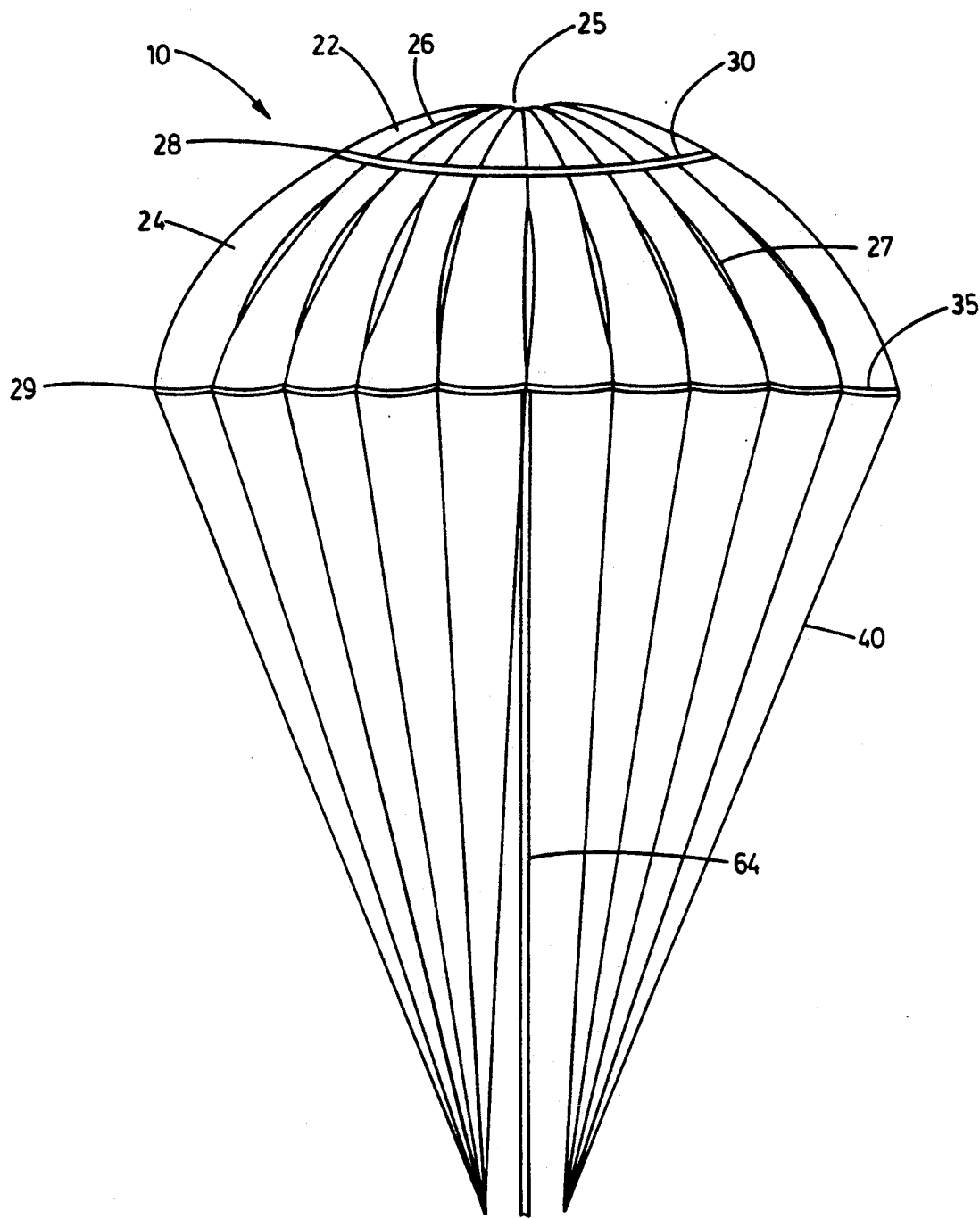
FIG. 3 is a partial cross section view of the present invention in a fully open condition and depicting the canopy and skirt bands.

Referring now to FIG. 3, a partial view of the preferred embodiment of the present invention is shown. The canopy (20) is comprised of two portions, an apex portion (22) and a reef portion (24). The apex portion (22) and reef portion (24) of the canopy (20) are attached so as to form or define an upper skirt (28) of the parachute (10). The reef portion (24) of the canopy (20) further defines a lower skirt (29) of the parachute (10). Located at the upper skirt (28) of the parachute (10) is an upper skirt band (30) which acts to transfer forces from the apex portion (22) of the canopy (20) to the load carrying members of the parachute (10) including the suspension lines (40). The upper skirt band (30) can also act as a means for attaching the apex portion (22) of the canopy (20) to the reef portion (24) of the canopy (20). In addition, the preferred embodiment of the present invention also has a lower skirt band (35) secured to the canopy (20) at the lower skirt (29) of the parachute (10). The lower skirt band (35) also acts to transfer forces from the canopy (20) to the suspension lines (40).

Also identified in FIG. 3 is a vent (25) which is located in the apex portion (22) of the canopy (20). The vent (25) is used primarily to provide stability to the parachute (10) as it descends. In both the high speed and low speed situations, the present invention causes the opening loads to be highest at or near the vent (25). In the preferred embodiment, like on most parachutes, the vent area is typically designed to withstand such forces.

The preferred embodiment of the present invention also includes a plurality of radial seams (26) in the canopy and a series of slots (27) in the reef portion (24) of the canopy (20) proximate the radial seams (26). The radial seams (26) are used to secure adjacent gores of the canopy together. The radial seams (26) also act to transfer the forces from the canopy (20) to the skirt bands (30,35) and ultimately to the load carrying members. The main purpose of the slots (27) in the canopy (20) is to further vent air at high velocities in order to equalize the pressure variations on the interior and exterior of the parachute (10) and thus reduce the drag. The opening and closing of the slots (27) effects changes to the coefficient of drag for the parachute (10). As discussed above, a change in the coefficient of drag changes the effective drag area of the parachute (10).

Figure 4:
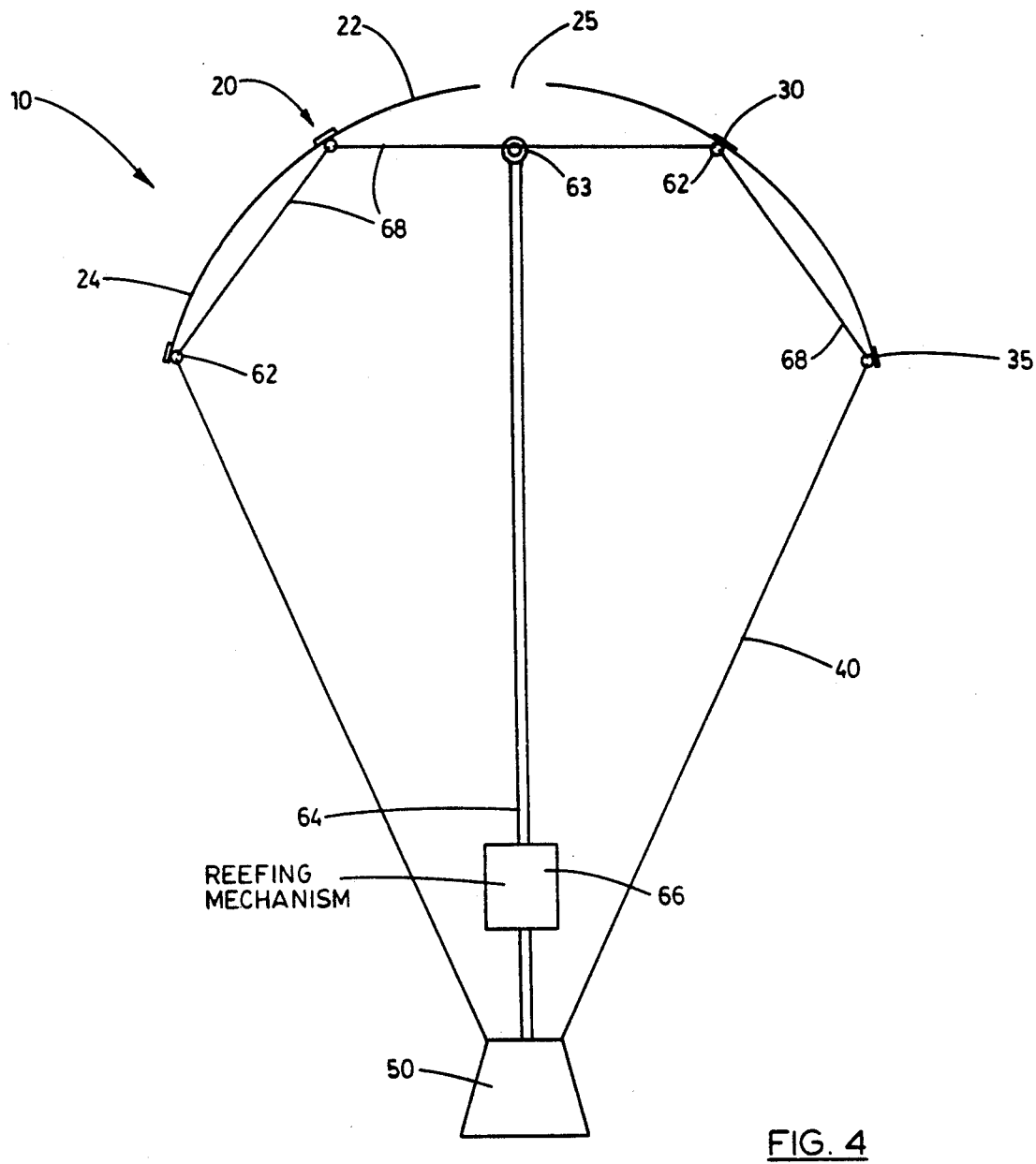
FIG. 4 is a partial view of the interior of the present invention illustrating the internal lines, reefing rings, and reefing member.

FIG. 4 depicts an interior view of the present invention and more particularly shows the means for controlling the inflation of the canopy used in the preferred embodiment. Shown is a network of internal lines (68), a reefing webbing (64) and reefing rings (62). The reefing rings (62) are located at or near the upper skirt (28) and optionally near the lower skirt (29) of the parachute (10). The reefing rings (62) are equally spaced around the periphery of the skirts (28,29). One end of the internal lines (68) is secured to the reefing rings (62) located at the lower skirt (29) and extend toward and through the reefing rings (62) located at the upper skirt (28). The opposite ends of the internal lines (68) are secured to the adjustable length reefing webbing (64). In the preferred embodiment, another ring (63) is used to secure the internal lines (68) to the adjustable length reefing webbing (64). The adjustable length reefing webbing (64) is further connected to a reefing control mechanism (66). This reefing control mechanism (66) adjusts the length of the reefing webbing (64) depending on the external deployment conditions. The reefing control mechanism (66) is further connected to the payload (50) such that the adjustable length reefing webbing (64) and internal lines (68) may act as load carrying members similar to the suspension lines (40).

Figure 6:
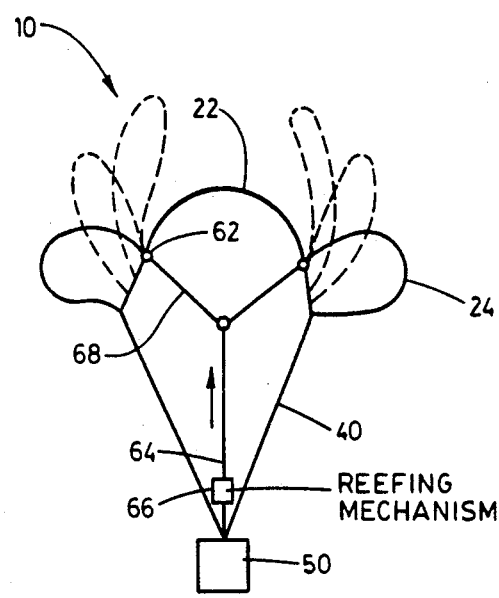
FIG. 6 is a partial cross section view of the regulated area parachute in an intermediate disreefing condition.
Figure 5:
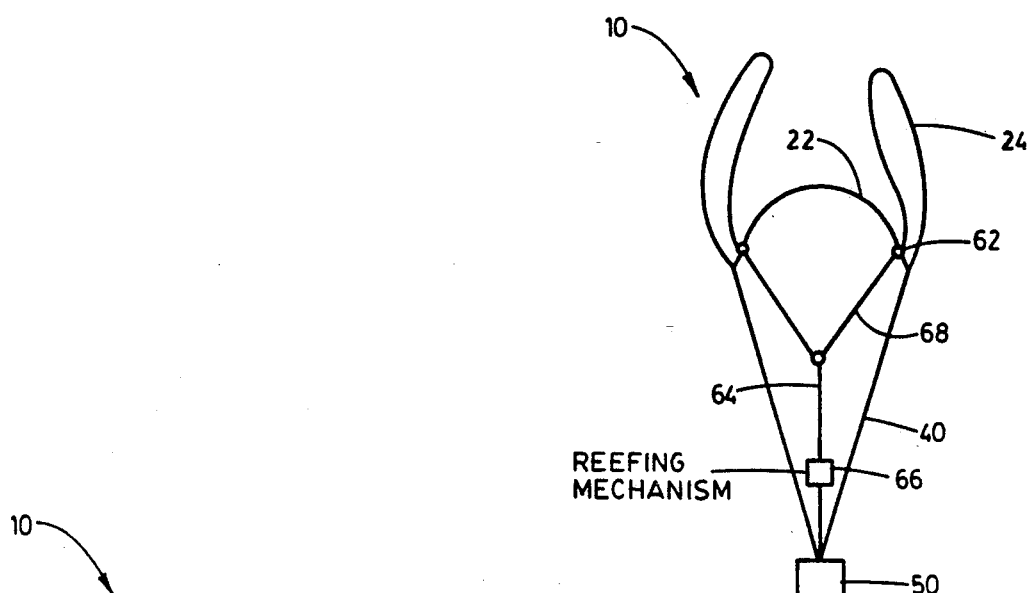
FIG. 5 is a partial cross section view of the regulated area parachute in a fully reefed condition.
Figure 7:
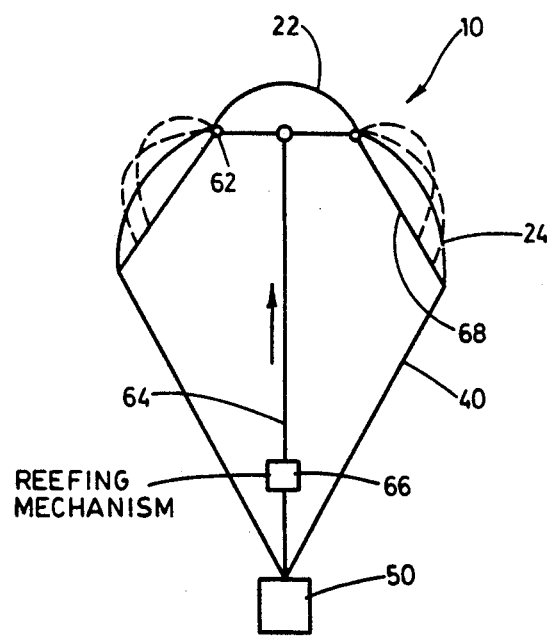
FIG. 7 is a partial cross section view of the regulated area parachute in a fully open condition.

Referring now to FIGS. 5-7, the parachute (10) is designed to be initially deployed with the adjustable length reefing webbing (64) in the fully reefed condition. In the fully reefed condition the adjustable length reefing webbing (64) is initially at the smallest permissible length, and the reefing rings (62) at the lower skirt (29) are fixed in close proximity to the reefing rings (62) at the upper skirt (28). This fully reefed condition restricts the ability of the reef portion (24) of the canopy (20) to inflate when the parachute (10) is deployed. In fact, as the parachute (10) is deployed in this fully reefed condition, only the apex portion (22) of the canopy (20) inflates and does so very quickly due to the relatively small volume of air required to fill it.

The reefing webbing (64) is designed to be attached to a reefing mechanism (66) or other device that will let it pay out, allowing the parachute (10) to inflate until a preset maximum drag force is reached. When that preset maximum drag force is reached, the webbing (64) is locked in place by the reefing mechanism (66). With the reefing webbing (64) locked in place, the parachute inflation process is halted. As the velocity of the payload (50) decays, the drag force will drop below the preset maximum force thereby allowing more of the adjustable length reefing webbing (64) to be let out and permitting additional inflation of the parachute (10). This sequence continues until the parachute (10) is fully inflated.

As the velocity of the payload (50) decays, the drag force caused by the parachute (10) is reduced. As stated above, this reduction in the drag force will permit the adjustable length reefing webbing (64) to be further let out by the reefing mechanism (66). This in turn allows the lower skirt (29) to drop away from the upper skirt (28) thereby changing the effective drag area of the parachute (10). The regulated change in effective drag area allows for a regulated inflation of the reef portion (24) of the canopy (20). The parachute (10) can thus inflate at a rate proportional to the velocity decay, thereby keeping the drag force approximately constant over the parachute opening time.

At high speeds the apex portion (22) of the canopy (20) inflates rapidly. However, the reefing webbing (64) and reefing mechanism (66) control the inflation of the reef portion (24) of the canopy (20) and thus regulate the total effective drag area of the parachute (10). By regulating the total effective drag area of the parachute (10), the opening forces can remain relatively constant during the opening of the parachute thereby ensuring that the opening forces are kept from exceeding human tolerance.

At low speeds, the regulated area parachute (10) allows for a very fast opening. As discussed above, the apex portion (22) of the canopy (20) opens very quickly. The reef portion (24) of the canopy (20), however, is inflated at a rate dependent of the opening forces that are present. In a low speed case, the opening forces would be minimal and the opening force needed to lock the reefing webbing (64) in place would not necessarily be reached. In this event, the reefing webbing (64) would pay out completely shortly after the apex portion (22) of the canopy (20) inflated thereby allowing full inflation of the parachute (10). Since the lower skirt (29) is initially opened to the diameter of the upper skirt (28), a large volume of air can enter the parachute (10), which causes the parachute (10) to inflate quickly at low speeds.

As previously discussed, a distinguishing feature of the present invention over the related art is that the effective drag area is a variable that is regulated by a reefing mechanism or the slots opening and closing or both, which are governed by deployment conditions. Yet another significant difference between the present invention and related art parachutes is found in the projected force versus time graphs for a typical deployment.

When an unreefed parachute opens, the large drag area causes a very high opening force which quickly subsides to a nominal level of force. In a one stage reefed parachute, the reefing system limits the amount of drag the parachute creates at one time. This results in two or more smaller peak forces, instead of one large peak force, prior to subsiding to the nominal level of force. Lastly, the present invention partially opens in a very rapid manner, which is followed by the continuous regulation of the drag area resulting in a flatter curve that approaches the ideal force versus time profile for a parachute.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

What is claimed is:

1. A regulated drag area parachute for decelerating a payload, comprising:

a canopy comprising an apex portion and a reef portion, the apex portion defining an upper skirt, the reef portion defining a lower skirt, the reef portion is attached to the apex portion proximate the upper skirt;

a plurality of reefing rings attached to the apex portion of the canopy proximate the upper skirt;

a plurality of internal lines, having a first end centrally connected to a single adjustable reefing member and a second end attached to the canopy proximate the lower skirt, the internal lines are further disposed such that they pass through the reefing rings proximate the upper skirt and in a manner that allows apex portion of the canopy to inflate independently from the reef portion of the canopy and that the apex portion of the canopy inflates rapidly and the effective drag area of the canopy can be continuously regulated during the deployment of the parachute; and a plurality of load bearing suspension lines adapted for connecting the payload to the canopy, the suspension lines affixed to the lower skirt of the canopy wherein during operation the load is continuously shared between the suspension lines and the internal lines so that at any given time during deployment the suspension lines bear at least half of the load.

2. The regulated drag area parachute of claim 1 wherein the plurality of internal lines further comprises:
  an adjustable length reefing member having a fixed and attached to the payload and the free end extending towards the apex portion of the canopy; and
  a plurality of fixed length internal lines having a first and connected to the free end of the reefing member and a second end attached to the canopy proximate the lower skirt, the internal lines are further disposed such that they pass through the reefing rings proximate the upper skirt.

3. The regulated drag area parachute of claim 2 wherein the means for controlling the inflation of the canopy and regulating the effective drag area of the canopy further comprises a reefing device operatively connected to the adjustable length reefing member whereby the adjustable length reefing member and fixed length internal lines are locked in place when a predetermined maximum drag force is attained.

4. The regulated drag area parachute of claim 1 further comprising:
  a lower skirt band attached to the lower skirt of the reef portion of the canopy and further adapted to connect with the suspension lines; and
  an upper skirt band attached to the apex portion of the canopy proximate the upper skirt.

5. The regulated drag area parachute of claim 4 wherein the means for controlling the inflation of the canopy and regulating the effective drag area of the canopy further comprises:
  a plurality of reefing rings attached to the canopy proximate the upper skirt band and lower skirt band; and
  a plurality of internal lines having a first end connected to the payload and a second end attached to the reefing rings proximate the lower skirt band, the internal lines are further disposed such that they pass through the reefing rings proximate the upper skirt band.

6. The regulated drag area parachute of claim 5 wherein the plurality of adjustable length internal lines further comprises:
  an adjustable length reefing webbing having a fixed end attached to the payload and the free end extending towards the apex portion of the canopy; and
  a plurality of fixed length internal lines having a first end connected to the free end of the reefing webbing and a second end attached to the reefing rings proximate the lower skirt band, the internal lines are further disposed such that they pass through the reefing rings proximate the upper skirt.

7. The regulated drag area parachute of claim 1 wherein the apex portion of the canopy further comprises a vent disposed proximate the uppermost region of the canopy.

8. The regulated drag area parachute of claim 1 wherein the parachute is a flat circular parachute.

9. The regulated drag area parachute of claim 1 wherein the canopy further comprises a plurality of radial seams running from the apex of the parachute to the lower skirt, the radial seams further defining a plurality of slots.

10. A regulated drag area parachute for decelerating a payload, comprising:
  a circular canopy having a vent proximate center of the circular canopy, the circular canopy further defining an upper skirt;
  a concentric reef canopy attached proximate to the upper skirt of the circular canopy, the concentric reef canopy having a plurality of slots and further having a lower skirt;
  a plurality of suspension lines adapted for connecting the payload to the lower skirt of the concentric reef canopy;
  a lower skirt band attached to the lower skirt of the concentric reef canopy and further adapted to connect with the suspension lines;
  an upper skirt band attached proximate to the upper skirt.
  a plurality of reefing rings attached around the periphery of the parachute proximate the upper skirt band and lower skirt band;
  an adjustable length reefing webbing having a fixed end attached to a reefing device and the adjustable and extending towards the apex portion of the canopy;
  a plurality of fixed length internal lines having a first end connected to the adjustable end of the reefing webbing and a second end attached to the reefing rings proximate the lower skirt band, the internal lines are further disposed such that they pass through the reefing rings proximate the upper skirt band and wherein during operation the load is continuously shared between the suspension lines and the internal lines so that at any given time during deployment the suspension lines bear at least half of the load; and the reefing device operatively connected to the reefing webbing whereby the adjustable length reefing webbing and fixed internal lines are locked in place when a predetermined maximum drag force is attained and the reefing webbing is free to pay out when the opening forces are less than the predetermined maximum drag force.

11. A method for regulating the drag area of a parachute, used to decelerate a payload, the method comprising the steps of:

providing a canopy, the canopy comprising an apex portion and a reef portion, the apex portion defining an upper skirt, the reef portion defining a lower skirt, the reef portion is attached to the apex portion proximate the upper skirt;

attaching a plurality of suspension lines to the reef portion of the canopy proximate the lower skirt;

attaching a plurality of reefing rings to the apex portion of the canopy proximate the upper skirt;

attaching an adjustable length reefing member having a fixed end attached to the payload and the free end extending towards the apex portion of the canopy;

connecting a plurality of internal liens to the canopy proximate the lower skirt, the internal lines are further disposed such that they pass through the reefing rings proximate the upper skirt and are secured to the reefing member and wherein during operation the load is continuously shared between the suspension lines and the internal lines so that at any given time during deployment the suspension lines bear at least half of the load; and controlling the adjustable length of the reefing member so that the apex portion of the canopy inflates independently from the reef portion of the canopy and that the effective drag area of the canopy can be regulated during the deployment of the parachute.

12. The method of regulating the drag area of a parachute of claim 11 wherein the step of controlling the adjustable length of the reefing member further comprises operatively connecting a reefing device to the reefing member whereby the adjustable length reefing member and fixed length internal lines are locked in place when a predetermined maximum drag force is attained and the reefing member is free to pay out when the opening force is less than the predetermined maximum drag force.

13. The method of regulating the drag area of a parachute of claim 11 wherein the step of attaching an adjustable length reefing member further comprises attaching an adjustable length reefing webbing having a fixed end attached to the payload and a free end extending towards the apex portion of the canopy.

14. The method of regulating the drag area of a parachute of claim 11 further comprising the steps of:

attaching a lower skirt band to the lower skirt of the reef portion of the canopy and further adapted to connect with the suspension lines; and attaching an upper skirt band to the apex canopy portion proximate the upper skirt.

* * * * *